(12) United States Patent
Lord

(10) Patent No.: US 9,951,633 B2
(45) Date of Patent: Apr. 24, 2018

(54) REDUCED LENGTH TRANSITION DUCTS

(71) Applicant: UNITED TECHNOLOGIES CORPORATION, Farmington, CT (US)

(72) Inventor: Wesley K. Lord, South Glastonbury, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 475 days.

(21) Appl. No.: 14/518,009

(22) Filed: Oct. 20, 2014

(65) Prior Publication Data

US 2015/0300253 A1   Oct. 22, 2015

Related U.S. Application Data

(60) Provisional application No. 61/939,355, filed on Feb. 13, 2014.

(51) Int. Cl.
  *F01D 9/02*    (2006.01)
  *F02C 3/107*   (2006.01)
  *F01D 9/04*    (2006.01)

(52) U.S. Cl.
  CPC .............. *F01D 9/02* (2013.01); *F01D 9/023* (2013.01); *F01D 9/047* (2013.01); *F02C 3/107* (2013.01); *F05D 2240/12* (2013.01); *F05D 2250/38* (2013.01); *Y02T 50/671* (2013.01)

(58) Field of Classification Search
  CPC ............. F05D 2270/17; F05D 2240/12; B64D 2033/0226; F02C 3/107; F01D 9/02; F01D 9/023; F01D 9/047
  See application file for complete search history.

(56) References Cited

U.S. PATENT DOCUMENTS

2007/0012046 A1* 1/2007 Larsson .................... F01D 1/02
                                                60/791
2008/0138197 A1  6/2008 Green et al.

* cited by examiner

*Primary Examiner* — Pascal M Bui Pho
*Assistant Examiner* — Thuyhang Nguyen
(74) *Attorney, Agent, or Firm* — Cantor Colburn LLP

(57) ABSTRACT

A transition duct defining an airflow pathway between a low pressure compressor and a high pressure compressor of a gas turbine engine is disclosed. The transition duct may comprise an inner wall and an outer wall located radially outward of the inner wall with respect to a central axis of the gas turbine engine. It may further comprise a first bend configured to turn the airflow radially inward with respect to the central axis, and a turning vane located at the first bend between the inner wall and the outer wall. The turning vane may be configured to assist the first bend in turning the airflow radially inward.

15 Claims, 8 Drawing Sheets

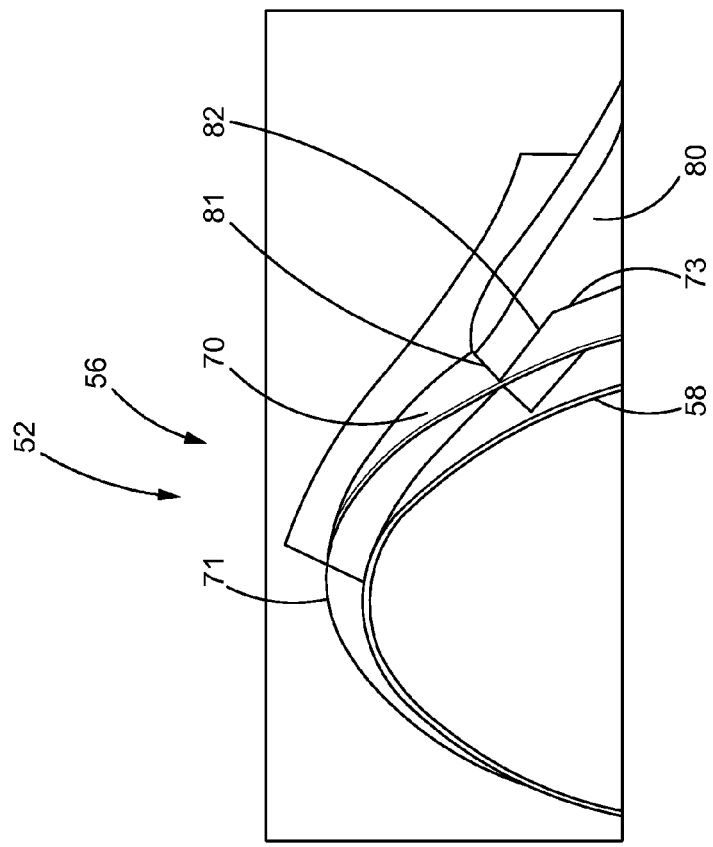
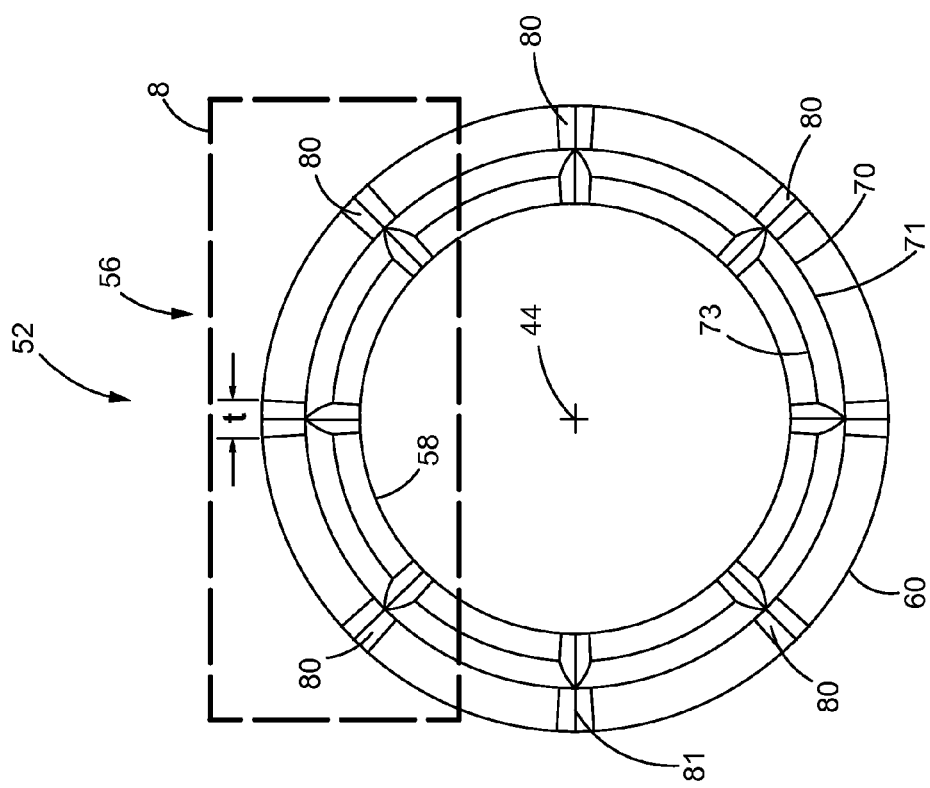
FIG. 8
FIG. 7

REDUCED LENGTH TRANSITION DUCTS

CROSS REFERENCE TO RELATED APPLICATION

This application claims priority under 35 USC § 119(e) to U.S. Provisional Patent Application Ser. No. 61/939,355 filed on Feb. 13, 2014.

FIELD OF THE DISCLOSURE

The present disclosure generally relates to gas turbine engines and, more specifically, relates to gas turbine engines with reduced airflow separation.

BACKGROUND

Gas turbine engines are internal combustion engines used to provide thrust to an aircraft or to provide power for land-based applications. In general, a gas turbine engine may consist of a fan section and a core engine located downstream of the fan section. In an upstream to downstream direction, the core engine may generally include: 1) a compressor section, which may include a low pressure compressor (LPC) located upstream from a high pressure compressor (HPC), 2) one or more combustors, and 3) a turbine section, which may include a high-pressure turbine (HPT) located upstream from a low-pressure turbine (LPT).

Efforts toward more advanced gas turbine engine designs may be focused on increasing the engine's overall pressure ratio (OPR) which is the ratio of the air pressure at the outlet of the HPC to the air pressure at the inlet of the fan section, as higher OPRs may correlate with higher engine thermodynamic efficiency. To achieve higher OPRs, advanced gas turbine engine designs may have increasing numbers of turbomachinery stages in the compressor section, as each additional turbomachinery stage provides a pressure increase. While effective, this approach may lead to an increased overall engine length and weight, which may present challenges to engine installation and maintenance and may have adverse impacts on rotor dynamics.

Advanced gas turbine engine architectures may also incorporate high-speed LPCs which have higher pressure ratios than traditional low-speed LPCs. However, in contrast with low-speed LPCs which may have radially inwardly curved flowpaths, high-speed LPCs may have straight (or constant radius) flowpaths. As a result, there may be a larger radial offset between the outlet of the LPC and the inlet of the HPC in gas turbine engines incorporating high-speed LPCs. The larger radial offset between the LPC and the HPC may require a longer transition duct between the LPC and the HPC than in earlier engine designs, as curvature in the transition duct may be limited by risks of airflow separation. In particular, the transition duct between the LPC and the HPC may define a roughly "S"-shaped airflow pathway with a first bend at the entrance to the transition duct, and a second bend further downstream prior to entry into the HPC. Pressure gradients may be generated at both an inner wall and an outer wall of the transition duct between the first bend and the second bend as the airflow is turned through the duct, and the magnitude of the pressure gradients may generally increase with increasing curvature or turning angles at the first bend and the second bend. If the pressure gradients are too large, the airflow through the transition duct may separate and reduce the aerodynamic performance of the engine. To keep the pressure gradients within tolerable limits and avoid airflow separation, the curvature of the transition duct may be limited to a certain extent, leading to a more extended structure with increased an axial length with respect to an engine central axis. The curvature constraints on transition ducts may further exacerbate engine length and weight issues in many gas turbine engine designs, particularly in those having high-speed LPCs.

In order to provide transition ducts with shorter axial lengths, current efforts seek to reduce the likelihood of airflow separation in the duct. For example, U.S. Publication Number US 2008/0138197 discloses a transition duct having endwalls with non-axisymmetric perturbations to minimize flow separation and possibly allow for shorter transition ducts with more abrupt curvature. The wall perturbations may take the form of protruding blisters or recessed hollows. While effective, additional enhancements for reducing airflow separation to allow for shorter transition ducts with more pronounced curvature are still wanting.

Clearly, there is a need for improved strategies for reducing the axial lengths of transition ducts in gas turbine engines.

SUMMARY OF THE DISCLOSURE

In accordance with one aspect of the present disclosure, a transition duct defining an airflow pathway between a low pressure compressor and a high pressure compressor of a gas turbine engine is disclosed. The transition duct may comprise an inner wall, an outer wall located radially outward of the inner wall with respect to a central axis of the gas turbine engine, and a first bend configured to turn the airflow radially inward with respect to the central axis. It may further comprise a turning vane located at the first bend between the inner wall and the outer wall, and the turning vane may be configured to assist the first bend in turning the airflow radially inward.

In another refinement, the first bend may be configured to turn the airflow radially inward by a turning angle of between about 10° and about 90°.

In another refinement, the turning vane may have a camber of between about 10° and about 90°.

In another refinement, the turning vane may be located about midway between the inner wall and the outer wall.

In another refinement, the transition duct may further comprise a plurality of struts extending radially from the inner wall to the outer wall, and the turning vane may be mounted on at least one of the plurality of struts.

In another refinement, the transition duct may further comprise a second bend located downstream of the first bend, and the second bend may be configured to turn the airflow from a radially inward direction towards an axial direction with respect to the central axis.

In another refinement, the transition duct may comprise a second turning vane located at the second bend between the inner wall and the outer wall, and the second turning vane may be configured to assist the second bend in turning the airflow towards the axial direction.

In another refinement, the second turning vane may have a camber of between about 10° and about 90°.

In another refinement, the second turning vane may be located about midway between the inner wall and the outer wall.

In another refinement, the second turning vane may be mounted on at least one of the plurality of struts.

In accordance with another aspect of the present disclosure, a gas turbine engine is disclosed. The gas turbine engine may comprise a fan section and a core engine located downstream of the fan section. The core engine may comprise a low pressure compressor, a high pressure compressor, and a transition duct defining an airflow pathway between the low pressure compressor and the high pressure compressor. The transition duct may comprise an inner wall, an outer wall located radially outward of the inner wall with respect to a central axis of the gas turbine engine, and a first bend configured to turn the airflow radially inward with respect to the central axis. The transition duct may further comprise a turning vane located at the first bend between the inner wall and the outer wall, and the turning vane may be configured to assist the first bend in turning the airflow radially inward. The core engine may further comprise a combustor located downstream of the compressor section and a turbine section located downstream of the combustor.

In another refinement, a radial offset between a mean flow path line at an inlet of the high pressure compressor and a mean flow path line at an outlet of the low pressure compressor may be less than about 0.8.

In another refinement, the first bend may be configured to turn the airflow radially inward by a turning angle of between about 10° and about 90°.

In another refinement, the turning vane may have a camber of between about 10° and about 90°.

In another refinement, the transition duct may further comprise a plurality of struts extending radially from the inner wall to the outer wall, and the turning vane may be mounted on at least one of the plurality of struts.

In another refinement, the transition duct may further comprise a second bend located downstream of the first bend, and the second bend may be configured to turn the airflow from a radially inward direction towards an axial direction with respect to the central axis.

In another refinement, the transition duct may further comprise a second turning vane located at the second bend between the inner wall and the outer wall, and the second turning vane may be configured to assist the second bend in turning the airflow towards the axial direction.

In another refinement, the second turning vane may have a camber of between about 10° and 90°.

In another refinement, the second turning vane may be mounted about midway between the inner wall and the outer wall.

In accordance with another aspect of the present disclosure, a gas turbine engine is disclosed. The gas turbine engine may comprise a fan section and a core engine located downstream of the fan section. The core engine may comprise a compressor section, a combustor located downstream of the compressor section, a high pressure turbine located downstream of the combustor, and a low pressure turbine located downstream of the high pressure turbine. The core engine may further comprise transition duct defining a gas flow pathway between the high pressure turbine and the low pressure turbine. The transition duct may comprise an inner wall, an outer wall located radially outward of the inner wall with respect to a central axis of the gas turbine engine, and a first bend configured to turn the airflow radially outward with respect to the central axis. The transition duct may further comprise a turning vane located at the first bend between the inner wall and the outer wall and the turning vane may be configured to assist the first bend in turning the gas flow radially outward.

These and other aspects and features of the present disclosure will be more readily understood when read in conjunction with the accompanying drawings.

BRIEF DESCRIPTION OF THE DRAWINGS

FIG. 7 is a front view of an inlet of the transition duct of FIG. 3, constructed in accordance with the present disclosure.

FIG. 8 is a side perspective view of detail 8 of FIG. 7 with an outer wall removed for clarity, constructed in accordance with the present disclosure.

It should be understood that the drawings are not necessarily drawn to scale and that the disclosed embodiments are sometimes illustrated schematically and in partial views. It is to be further appreciated that the following detailed description is merely exemplary in nature and is not intended to limit the invention or the application and uses thereof. In this regard, it is to be additionally appreciated that the described embodiment is not limited to use in conjunction with a particular type of engine. Hence, although the present disclosure is, for convenience of explanation, depicted and described as certain illustrative embodiments, it will be appreciated that it can be implemented in various other types of embodiments and in various other systems and environments.

DETAILED DESCRIPTION

Figure 1:
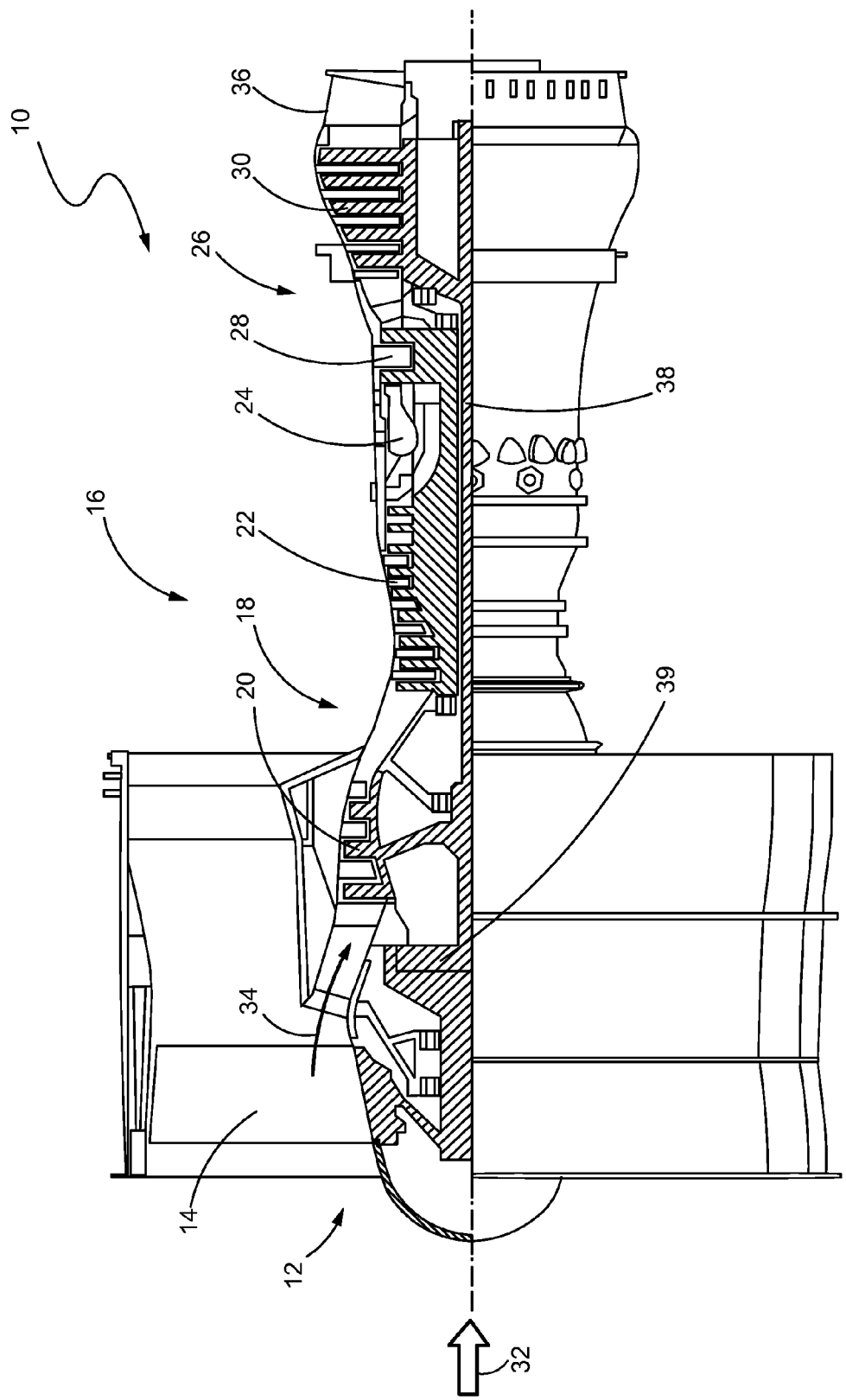
FIG. 1 is a side partial cross-sectional view of a gas turbine engine, constructed in accordance with the present disclosure.
Figure 2:
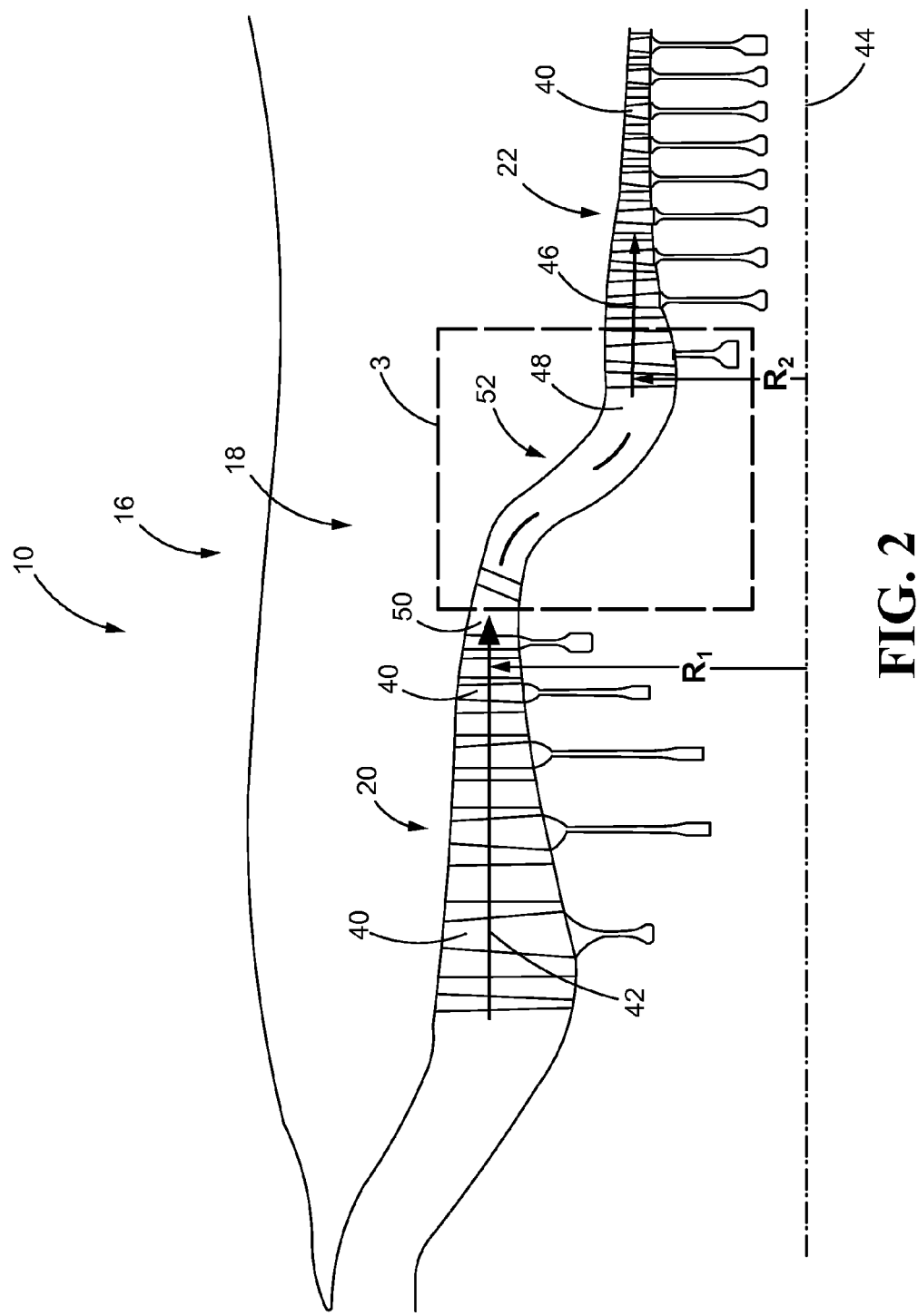
FIG. 2 is a side cross-sectional view of an upper portion of a compressor section of the gas turbine engine of FIG. 1, depicting a reduced length transition duct between a low pressure compressor and a high pressure compressor, constructed in accordance with the present disclosure.

Referring now to the drawings, and with specific reference to FIGS. 1 and 2, a gas turbine engine 10 is depicted. The gas turbine engine 10 may be associated with an aircraft to provide thrust, or it may be used to provide power in other applications. It may consist of a fan section 12 having a fan 14, as well as a core engine 16 located downstream of the fan section 12. In an upstream to downstream direction, the core engine 16 may generally include: 1) a compressor section 18, which may include a low pressure compressor (LPC) 20 located upstream from a high pressure compressor (HPC) 22, 2) an annular combustor 24 (although a series of circumferentially-spaced 'can' combustors may also be used), 3) and a turbine section 26, which may include a high pressure turbine (HPT) 28 located upstream from a low pressure turbine (LPT) 30. Other architectures may further include a three-spool engine including mid pressure compressor and turbine sections.

In operation, air 32 may be drawn into the engine 10 and it may be accelerated by the rotating blades of the fan 14, as best shown in FIG. 1. After passing through the fan section 12, a fraction of the indrawn air 32 may be routed through a primary flow pathway 34 defined by the core engine 16, as shown. In the primary flow pathway 34, the air 34 may first be compressed/pressurized in the compressor section 18, and it may then enter the combustor(s) 24 where it may be mixed with fuel and combusted to generate hot combustion gases. The hot combustion gases may then expand through and drive the turbine section 26 which may, in turn, drive the rotation of the fan section 12 and the compressor section 18. The gases may then be exhausted through an exhaust nozzle 36 to provide forward thrust to an associated aircraft.

In a geared fan architecture as shown in FIG. 1, a low speed shaft 38 may connect the LPT 30 to the LPC 20 and to a reduction gear 39. As such, power from the LPT 30 may be transmitted directly to the LPC 20 and also through the reduction gear 39 to the fan 14. The rotational speed (RPM) may be relatively high on the input (LPC/LPT) side of the reduction gear 39, and it may be reduced by a factor of three or more on the output (fan) side of the reduction gear 39. Thus the geared fan engine architecture may enable both a large low-speed fan and a compact high-speed low spool. However, those skilled in the art will understand that the gas turbine engine 10 may have other types of architectures as well, such as, but not limited to, a conventional two-spool turbofan architecture or a conventional three-spool turbofan architecture.

As best shown in FIG. 2, the gas turbine engine 10 may have an advanced architecture with a higher number of turbomachinery stages 40 in the LPC 20 and the HPC 22 compared with earlier gas turbine engine designs. For example, it may have five stages 40 in the LPC 20 and nine stages 40 in the HPC 20, as shown, although it may have other numbers of turbomachinery stages as well. Alternatively, the engine 10 may have a less advanced architecture with fewer numbers of turbomachinery stages 40. In any event, each stage 40 in the LPC 20 and the HPC 22 may increase the pressure ratio of the airflow, such as by about 1.2 to about 1.5.

The LPC 20 may be a high-speed LPC, such that a mean flowpath line 42 running through the LPC 20 (i.e., a mean line running through the center of the LPC between the inner and outer walls) may have an approximately constant radius ($R_1$) with respect to an engine central axis 44. Likewise, a mean flowpath line 46 running through the HPC 22 may have an approximately constant radius ($R_2$) with respect to the central axis 44 in some circumstances as well. Furthermore, the radial offset between an inlet 48 of the HPC 22 and an outlet 50 of the LPC 20, as measured by the ratio of the radius ($R_2$) at the inlet 48 of the HPC 22 to the radius ($R_1$) at the outlet 50 of the LPC 20, may be less than about 0.8 or less than about 0.6. However, the gas turbine engine 10 may have other types of LPCs with curved radii and/or varying radial offsets between the HPC and the LPC.

Figure 3:
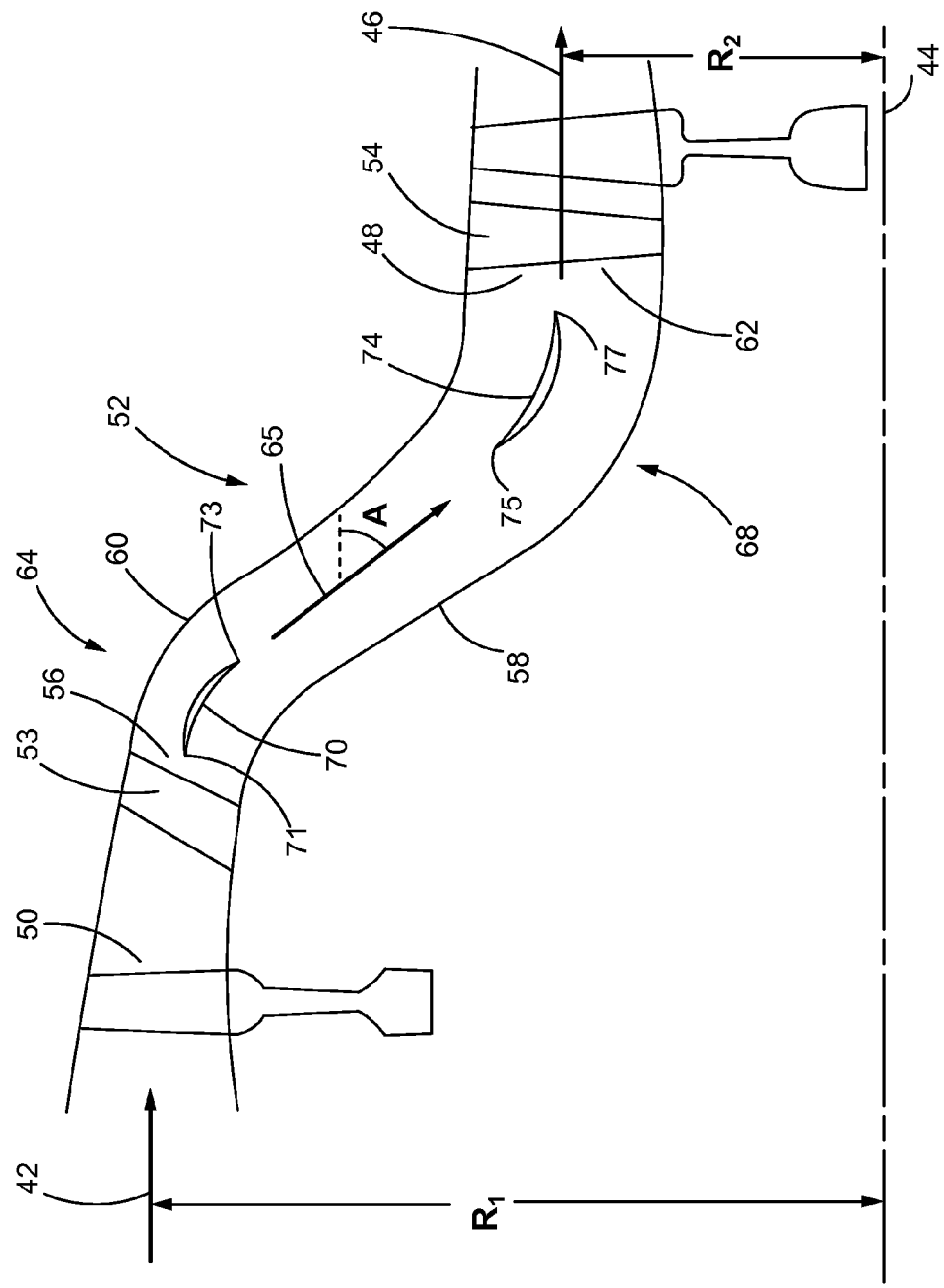
FIG. 3 is a side cross-sectional view of detail 3 of FIG. 2, constructed in accordance with the present disclosure.

As best shown in FIG. 3, a transition duct 52 may be located between an exit guide vane 53 of the LPC 20 and an inlet guide vane 54 of the HPC 22 and it may define a pathway for airflow between the LPC 20 and the HPC 22. In particular, the transition duct 52 may have an inlet 56 downstream of the exit guide vane 53, an inner wall 58, an outer wall 60 located radially outward of the inner wall 58, and an outlet 62 located upstream of the inlet guide vane 54. The inner wall 58 and the outer wall 60 may circumferentially extend around the central axis 44 to create and annular flow path for air between the LPC 20 and the HPC 22. The transition duct 52 may also have a first bend 64 disposed near the inlet 56 that may be configured to turn the airflow exiting the LPC 20 from an approximately axial direction with respect to the central axis 44 to a radially inward direction 65 with respect to the central axis 44. For example, the first bend 64 may turn the airflow radially inward by a turning angle (A) of between about 10° to about 90°. The transition duct 52 may further include a second bend 68 located downstream of the first bend 64 that may be configured to turn the airflow from the radially inward direction 65 to an approximately axial direction with respect to the central axis 44 prior to its entry into the HPC 22. In accordance with the present disclosure, the term "axial direction" may refer to directions which are about parallel to the central axis 44 or directions that deviate by ±40° from parallel to the central axis 44.

At least one turning vane 70 may be located at the first bend 64 of the transition duct 52 and it may cooperate with the first bend 64 in turning the airflow radially inward, as shown in FIG. 3. The turning vane 70 may be a non-rotating vane and it may have an annular shape that extends circumferentially about the engine central axis 44. Furthermore, the turning vane 70 may be mounted between the inner wall 58 and the outer wall 60 of the transition duct 52. As a non-limiting possibility, it may be mounted about midway between the inner wall 58 and the outer wall 60, as shown. The turning vane 70 may have a leading edge 71 oriented toward the inlet 56, a trailing edge 73 positioned downstream of the leading edge 71, and a camber, as measured by the airflow turning angle between the leading edge 71 and the trailing edge 73, of between about 10° to about 90°. In some cases, the camber of the turning vane 70 may match or approximately match the turning angle (A), although it may deviate from the turning angle (A) as well.

Notably, by assisting to turn the airflow and by providing additional walls for accumulation of air pressure gradients, the turning vane 70 may alleviate at least some of the pressure gradients which may build up on the walls 58, 60 as the airflow turns at the first bend 64 and the second bend 68. In this way, the turning vane 70 may assist in maintaining unseparated airflow in the transition duct 52, thereby allowing for more pronounced curvature and/or turning angles at the first bend 64. Consequently, the turning vane 70 may allow for more a more compact transition duct with a shorter axial length with respect to the central axis 44, which may ultimately provide advantageous reductions in overall engine length and/or weight.

Figure 4:
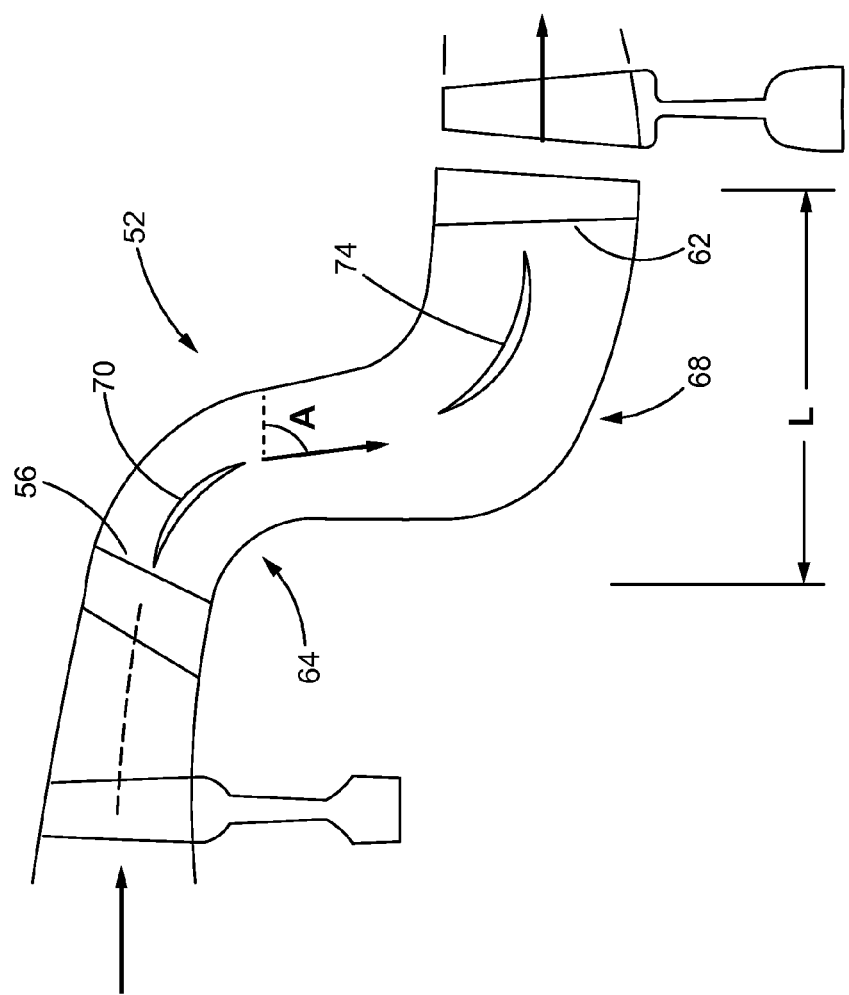
FIG. 4 is a side cross-sectional view similar to FIG. 3, but showing a transition duct with more pronounced curvature and a shorter axial length, constructed in accordance with the present disclosure.

As an optional arrangement, at least one second turning vane 74 may also be located at the second bend 68 between the inner wall 58 and the outer wall 60. The second turning vane 74 may assist in turning the airflow from the radially inward direction 65 toward an axial direction prior to its entry into the HPC 22. Like the turning vane 70, the second turning vane 74 may be a non-rotating vane and it may have an annular shape that extends circumferentially about the central axis 44. Furthermore, it may have a leading edge 75 oriented upstream from a trailing edge 77, and a camber of between about 10° and about 90°. If present, the second turning vane 74 may further assist in maintaining unseparated airflow in the transition duct 52 by assisting to mitigate air pressure gradients which may build up on the inner wall 58 and the outer wall 60 as the airflow is turned through the transition duct 52. Accordingly, the second turning vane 72 may allow for more abrupt/sharper curvature at the first bend 64 and the second bend 68, thereby supporting a transition duct 52 with an even shorter axial length. As one possibility, the turning vane 70 and the optional second turning vane 74 may support turning angles (A) as high as about 90° as well as sharp curvatures at the first bend 64 and the second bend 68 (see FIG. 4). Such an arrangement may provide a transition duct 52 with a minimized axial length (L) as measured from the inlet 56 to the outlet 62.

Figures 5, 6:
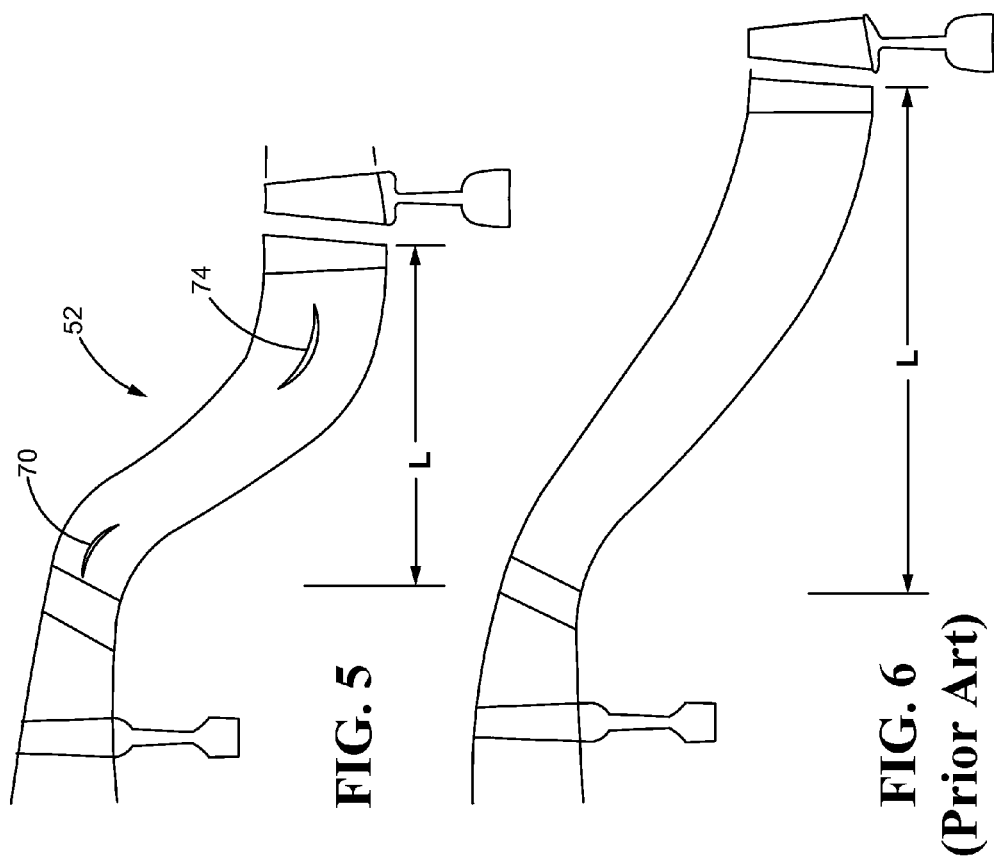
FIG. 5 is a side cross-sectional view similar to FIG. 3, but showing an axial length of the transition duct, constructed in accordance with the present disclosure.
FIG. 6 is a side cross-sectional view of a transition duct of the prior art.

FIGS. 5-6 illustrate a reduction in transition duct axial length (L) which may be achieved by incorporation of one or more turning vanes in the transition duct 52 compared with a transition duct of the prior art that lacks turning vanes. In order to minimize the accumulation of pressure gradients on the inner and outer walls and to avoid flow separation, the transition duct of the prior art may require a more extended or stretched-out configuration with curves at the first bend and the second bend that extend over a relatively wide axial length (see FIG. 6). In contrast, the transition duct 52 of the present disclosure may have sharper turns and more pronounced curvatures by virtue of the turning vane 70 and the optional second turning vane 74 which may assist in avoiding airflow separation. Accordingly, the axial length (L) of the transition duct 52 of the present disclosure may be significantly shorter than the transition duct of the prior art, as shown. In some cases, axial length reductions as great as 30% or more may be achieved by incorporation of one or more turning vanes into the transition duct 52, although greater reductions may be achieved in some cases as well.

A possible mounting arrangement for the turning vane 70 in the transition duct 52 is depicted in FIGS. 7-8. In particular, the turning vane 70 may be supported by one or more struts 80 which may extend radially from the inner wall 58 to the outer wall 60 and through at least a portion of the length of the duct 52. The transition duct 52 may have eight struts 80 or other numbers of struts, and each of the struts 80 may have a leading edge 81 and a thickness (t). In some cases, slits 82 may be introduced into the struts 80 to accommodate the turning vane 70, as shown in FIG. 8. The turning vane 70 may be cast as an integral structure with the struts 80 or it may be welded or bonded to the struts 80. Alternatively, it may be mechanically attached to the struts 80 with suitable fasteners such as bolts or screws. Although typically used to accommodate components such as air lines or oil lines, additional struts may be introduced into the transition duct 52 for the sole purpose of supporting the turning vane 70 in some circumstances. As will be understood, similar mounting arrangements may be used to support the second turning vane 74 at the second bend 68.

Figure 10:
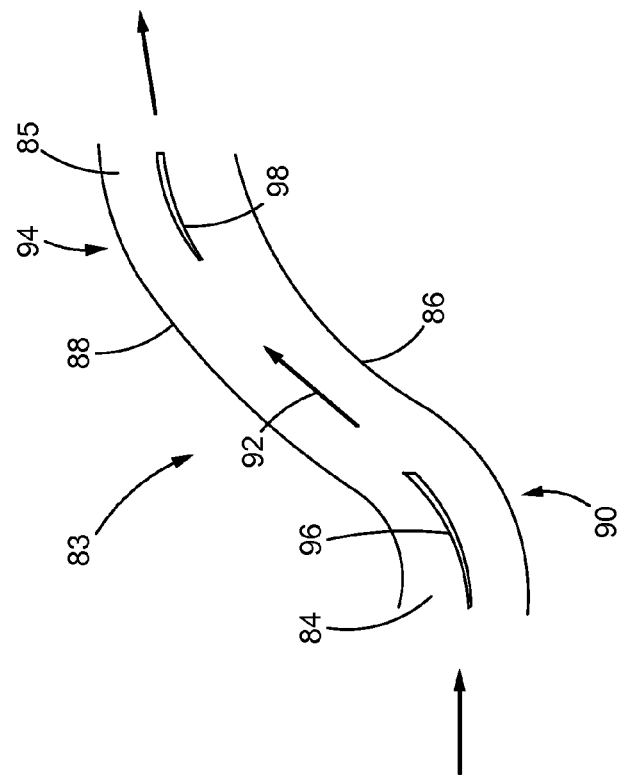
FIG. 10 is a side cross-sectional view of detail 10 of FIG. 9, constructed in accordance with the present disclosure.
Figure 9:
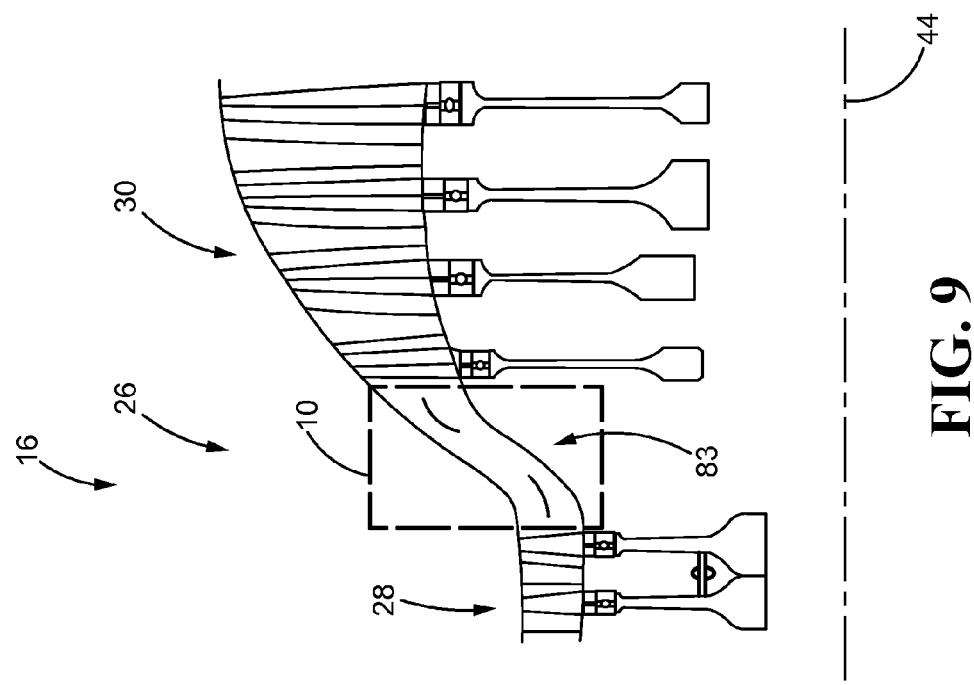
FIG. 9 is a side cross-sectional view of an upper portion of a turbine section of the gas turbine engine of FIG. 1, depicting a reduced length transition duct between a high pressure turbine and a low pressure turbine, constructed in accordance with the present disclosure.

The concepts of the present disclosure may be extended to other regions of the gas turbine engine 10 as well. For example, a transition duct 83 located between the HPT 28 and the LPT 30 may be shortened along its axial length by the introduction of one or more turning vanes, as shown in FIGS. 9-10. The transition duct 83 may define a gas flow pathway between the HPT 28 and the LPT 30 and it may have an inlet 84 disposed near an outlet of the HPT 28, an outlet 85 disposed near an inlet of the LPT 30, an inner wall 86, and an outer wall 88 located radially outward of the inner wall 86. The inner wall 86 and the outer wall 88 may circumferentially extend around the central axis 44 to create the gas flow pathway. The transition duct 83 may also have a first bend 90 disposed near the inlet 84 that may be configured to turn the gas flow from an approximately axial direction to a radially outward direction 92 with respect to the central axis 44, and a second bend 94 located downstream of the first bend 90 that may be configured to turn the gas flow from the radial outward direction 92 toward an axial direction, as shown. As explained above, the term "axial direction" may refer to directions which run about parallel to the central axis 44 or which deviate by ±40° from parallel to the central axis 44.

The first bend 90 of the transition duct 83 may be equipped with one or more turning vanes 96 that may be configured to assist in turning the gas flow from the axial direction to the radially outward direction 92. Likewise, the second bend 94 may optionally be equipped with one or more second turning vanes 98 configured to assist turning the gas flow from the radially outward direction 92 toward an axial direction. The turning vane 96 and the second turning vane 98 may each be positioned about midway between the inner wall 86 and the outer wall 88 and they may have cambers suitable to assist gas flow turning at the first bend 90 and the second bend 92, respectively. For example, they may have cambers of between about 10° and about 90° depending on the curvatures at the first bend 90 and the second bend 94, respectively. The turning vane 96 and the optional second turning vane 98 may alleviate pressure gradients on the walls 86, 88 as the gas flow is turned in the duct and, therefore, may assist in reducing gas flow separation. With the reduced risks of flow separation, the curvatures at the first bend 90 and the second bend 94 may be made more pronounced, allowing for a transition duct 83 with a shorter axial length (L) and a corresponding reduction in engine length and/or weight. As an additional possibility, transition duct 52 between the LPC 20 and the HPC 22 as well as the transition duct 83 between the HPT 28 and the LPT 30 may both be shortened by the incorporation of one or more turning vanes to provide even an even greater reduction in engine overall length and/or weight.

Figure 11:
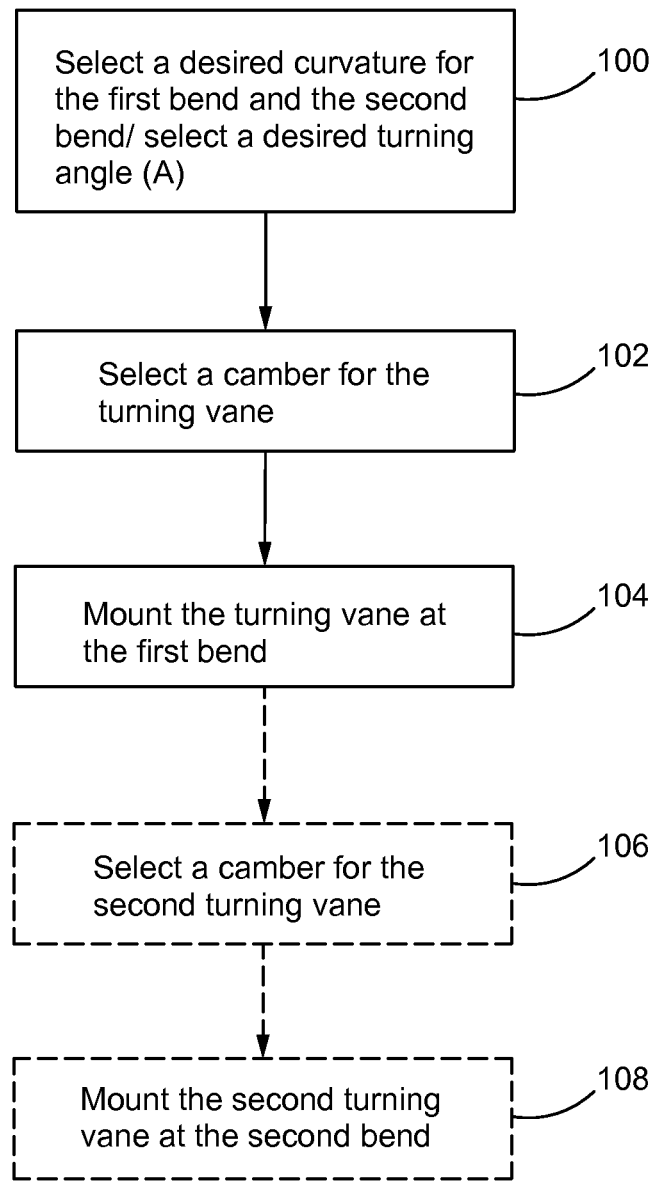
FIG. 11 is a flowchart depicting steps which may be involved in fabricating the transition duct of FIGS. 2-3, in accordance with a method of the present disclosure.

Referring now to FIG. 11, a series of steps which may be involved in fabricating the transition duct 52 are depicted. It will be understood that similar steps may be followed for fabricating the transition duct 83 as well. Beginning with a first block 100, a desired curvature for the first bend 64 and the second bend 68 and a desired turning angle (A) may be selected to provide a desired axial length (L) for the transition duct 52. According to a next block 102, a camber for the turning vane 70 may then be selected according to the selected curvature of the first bend 64 and/or the turning angle (A). The turning vane 70 having the selected camber may then be mounted at the first bend 64 between the inner wall 58 and the outer wall 60 according to a block 104. This may be achieved by mounting the turning vane 70 on one or more struts 80, as described above (see FIGS. 7-8). Alternatively, the turning vane 70 may be formed integrally with the struts 80.

If the second turning vane 74 is desired, a camber for the second turning vane 74 may be selected according to an optional block 106. In particular, the camber of the second turning vane 74 may be selected to accommodate the curvature of the second bend 68 and/or the turning angle (A). The second turning vane 74 may then be mounted at the second bend 68 between the inner wall 58 and the outer wall 60 using the mounting techniques described above, according to the block 108.

Although the present disclosure generally relates to transition ducts between the LPC and the HPC and between the HPT and the LPT, it will be understood that the concepts disclosed herein may be implemented in other gas flow or airflow ducts of the gas turbine engine as well, such as the airflow duct between the fan and the LPC. In addition, the concepts may be extended to other applications which may benefit from shortened fluid ducts. These and other alternatives are considered equivalents and within the scope and spirit of this disclosure.

INDUSTRIAL APPLICABILITY

In general, it can therefore be seen that the technology disclosed herein has industrial applicability in a variety of settings including, but not limited to, gas turbine engines. The transition ducts disclosed herein may have one or more turning vanes installed at one or more bends in the air or gas flow pathway to assist in turning the air or gas flow in desired directions. In addition, the turning vanes may relieve the severity of pressure gradients along the transition duct walls and allow for sharper transition duct turns due to reduced risks of air/gas flow separation. By enabling more pronounced curvatures, the transition ducts of the present disclosure may have shorter axial lengths which may lead to advantageous reductions in engine length and weight. The reduced length transition ducts may be particularly beneficial in more advanced gas turbine engine architectures which may be longer due to their higher numbers of turbomachinery stages and their higher radial offsets between the LPC and HPC, although the reduced length transition ducts may provide beneficial engine length/weight reduction in other types of gas turbine engine architectures as well. It is expected that the technology disclosed herein may find wide industrial applicability in areas such as, but not limited to, aerospace and power generation applications.

What is claimed is:

1. A transition duct defining an airflow pathway between a low pressure compressor and a high pressure compressor of a gas turbine engine, the transition duct comprising:
    an inner wall;
    an outer wall located radially outward of the inner wall with respect to a central axis of the gas turbine engine;
    a first bend configured to turn an airflow of the airflow pathway radially inward with respect to the central axis;
    a turning vane located at a midway between the inner wall and the outer wall and at the first bend between the inner wall and the outer wall, the turning vane being configured to assist the first bend in turning the airflow radially inward along a radially inward direction, the turning vane having a trailing edge;
    a second bend located downstream of the first bend, and wherein the second bend is configured to turn the airflow from the radially inward direction towards an axial direction with respect to the central axis; and
    a second turning vane located at the second bend between the inner wall and the outer wall, and wherein the second turning vane is configured to assist the second bend in turning the airflow towards the axial direction, the second turning vane having a leading edge, wherein the trailing edge and the leading edge are aligned along the radially inward direction.

2. The transition duct of claim 1, wherein the first bend is configured to turn the airflow radially inward by a turning angle of between substantially 10° and substantially 90°.

3. The transition duct of claim 2, wherein the turning vane has a camber of between substantially 10° and substantially 90°.

4. The transition duct of claim 2, wherein the turning vane is located at a midway between the inner wall and the outer wall.

5. The transition duct of claim 3, wherein the transition duct further comprises a plurality of struts extending radially from the inner wall to the outer wall, and wherein the turning vane is mounted on at least one of the plurality of struts.

6. The transition duct of claim 1, wherein the second turning vane has a camber of between substantially 10° and substantially 90°.

7. The transition duct of claim 6, wherein the second turning vane is located substantially midway between the inner wall and the outer wall.

8. The transition duct of claim 1, wherein the transition duct further comprises a plurality of struts extending radially from the inner wall to the outer wall, and wherein the second turning vane is mounted on at least one of the plurality of struts.

9. A gas turbine engine, comprising:
    a fan section having a fan operably coupled to a low pressure turbine via a reduction gear; and
    a core engine located downstream of the fan section, the core engine comprising:
        a low pressure compressor operably coupled to the low pressure turbine, wherein the reduction gear causes the fan to rotate slower than the low pressure compressor,
        a high pressure compressor located downstream of the low pressure compressor,
        a transition duct defining an airflow pathway between the low pressure compressor and the high pressure compressor, the transition duct comprising:
            an inner wall,
            an outer wall located radially outward of the inner wall with respect to a central axis of the gas turbine engine,
            a first bend configured to turn an airflow of the airflow pathway radially inward with respect to the central axis,
            a turning vane located at a midway between the inner wall and the outer wall and at the first bend between the inner wall and the outer wall, the turning vane being configured to assist the first bend in turning the airflow radially inward along a radially inward direction, the turning vane having a trailing edge,
            a second bend located downstream of the first bend, and wherein the second bend is configured to turn the airflow from the radially inward direction towards an axial direction with respect to the central axis;
            a second turning vane located at the second bend between the inner wall and the outer wall, and wherein the second turning vane is configured to assist the second bend in turning the airflow towards the axial direction, the second turning vane having a leading edge, wherein the trailing edge and the leading edge are aligned along the radially inward direction; and
        a combustor located downstream of the compressor section, and a turbine section located downstream of the combustor.

10. The transition duct of claim 1, wherein the first bend is configured to turn the airflow radially inward by a turning angle of between substantially 10° and substantially 90°.

11. The transition duct of claim 2, wherein the turning vane has a camber of between substantially 10° and substantially 90°.

12. The gas turbine engine of claim 11, wherein the transition duct further comprises a plurality of struts extending radially from the inner wall to the outer wall, and wherein the turning vane is mounted on at least one of the plurality of struts.

13. The transition duct of claim 1, wherein the second turning vane has a camber of between substantially 10° and substantially 90°.

14. The transition duct of claim 6, wherein the second turning vane is mounted substantially midway between the inner wall and the outer wall.

15. A gas turbine engine, comprising:
- a fan section; and
- a core engine located downstream of the fan section, the core engine comprising:
  - a compressor section,
  - a combustor located downstream of the compressor section,
  - a high pressure turbine located downstream of the combustor,
  - a low pressure turbine located downstream of the high pressure turbine, and
  - a transition duct defining a gas flow pathway between the high pressure turbine and the low pressure turbine, the transition duct comprising:
    - an inner wall,
    - an outer wall located radially outward of the inner wall with respect to a central axis of the gas turbine engine,
    - a first bend configured to turn an airflow of the airflow pathway radially outward with respect to the central axis, and
    - a turning vane located at a midway between the inner wall and the outer wall and at the first bend between the inner wall and the outer wall, the turning vane being configured to assist the first bend in turning the gas flow radially outward along a radially outward direction, the turning vane having a trailing edge;
    - a second bend located downstream of the first bend, and wherein the second bend is configured to turn the airflow from the radially outward direction towards an axial direction with respect to the central axis; and
    - a second turning vane located at the second bend between the inner wall and the outer wall, and wherein the second turning vane is configured to assist the second bend in turning the airflow towards the axial direction, the second turning vane having a leading edge, wherein the trailing edge and the leading edge are aligned along the radially outward direction.

* * * * *